Oct. 2, 1923.
G. A. BAILEY
ANIMAL POKE
Filed Sept. 21, 1922
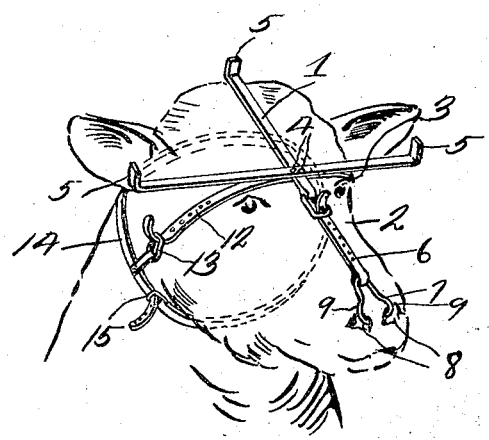
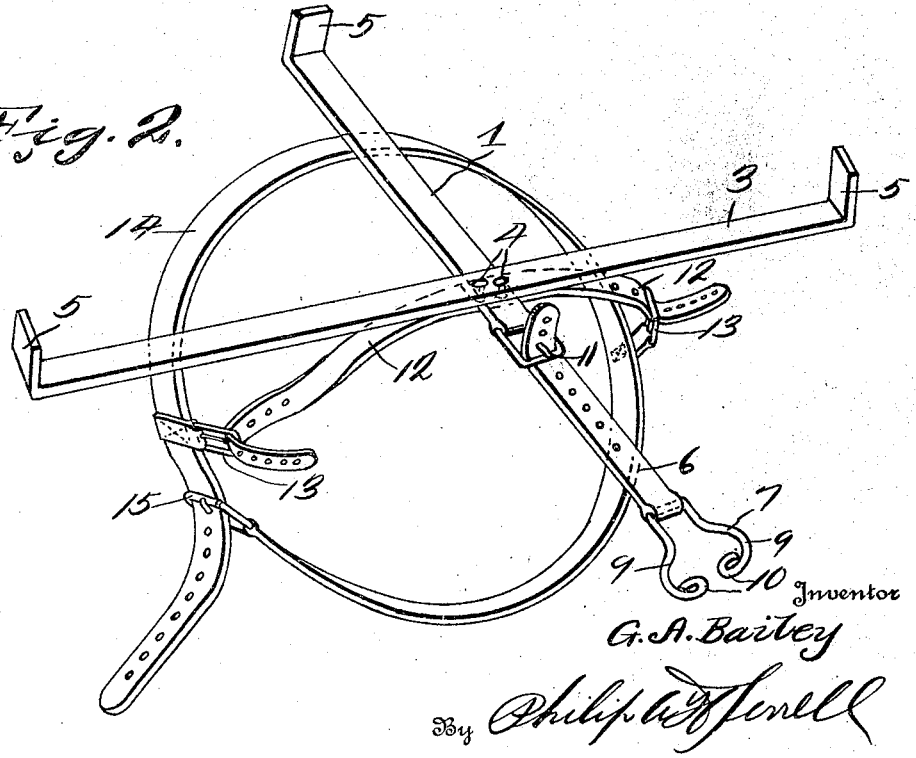

Patented Oct. 2, 1923.

1,469,492

UNITED STATES PATENT OFFICE.

GEORGE A. BAILEY, OF MANNING, IOWA.

ANIMAL POKE.

Application filed September 21, 1922. Serial No. 589,554.

*To all whom it may concern:*

Be it known that I, GEORGE A. BAILEY, a citizen of the United States, residing at Manning, in the county of Carroll and State of Iowa, have invented certain new and useful Improvements in Animal Pokes, of which the following is a specification, reference being had therein to the accompanying drawings.

The invention relates to animal pokes, and has for its object to provide a device of this character comprising crossed members disposed on the forward side of the animal's head and provided with a strap to which is attached a nostril engaging member. The crossed members form means for engaging a fence when the animal tries to breach the fence and cause a pull on the nostrils in such a manner as to cause pain, and consequently cause the animal to cease trying to breach the fence.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the device showing the same applied to an animal's head.

Figure 2 is an enlarged perspective view of the device.

Referring to the drawing, the numeral 1 designates an elongated member which engages the forward side of the animal's head between the eyes, and 3 a transversely disposed bar which is secured at 4 to the member 1. The upper end of the bar 1, and the ends of the bar 3 are provided with outwardly extending portions 5, which portions, when the animal tries to breach the fence, cause a twisting of the bars 1 and 3 in such a manner that a pull is imparted on the strap 6 and consequently a pull is imparted on the U-shaped nose engaging clamp 7, which is disposed within the nostrils 8 of the animal, thereby causing pain and consequently causing the animal to cease its efforts to breach the fence. The ends of the arms 9 of the member 7 curve inwardly toward each other and terminate in eyes 10, which eyes will not break the skin within the nostrils. The strap 6 is adjustably connected to the bar 1 by means of a buckle 11, thereby allowing the device to be adjusted to different size animals. Secured to the underside of the bar 1 where it crosses the bar 3 is a strap 12, the ends of which extend through buckles 13 carried by the neck band 14, and by means of which straps 12 the device may be securely held on the animal's head against downward movement after the neck band has been tightened by means of the buckle 15. It will be seen that the neck band will be adjusted to animals having necks of various sizes, and that by adjusting the strap 12, the device may be securely held on the animal's forehead.

From the above it will be seen that an animal poke or breach preventer is provided, which is simple in construction, the parts reduced to a minimum, and the device so constructed that it may be applied to various sizes of animals.

The invention having been set forth what is claimed as new and useful is:—

A fence breaching preventer for animals, said preventer comprising rigid crossed members adapted to be disposed on the forehead of an animal, the ends of the crossed members being bent forwardly, a nostril clamp comprising a U-shaped member having its arms extending inwardly towards each other and terminating in eyes, a strap carried by said clamp, said strap passing through a buckle carried by the crossed members, a neck band, a strap secured to the under side of the crossed members, the ends of said last named strap passing through buckles carried by the neck band.

In testimony whereof I hereunto affix my signature.

GEORGE A. BAILEY.